(12) United States Patent
McKelvey

(10) Patent No.: US 8,020,911 B2
(45) Date of Patent: Sep. 20, 2011

(54) SLIDING CARGO CARRIER FOR VEHICLE

(76) Inventor: Richard L. McKelvey, Rogers, AR (US)

(*) Notice: Subject to any disclaimer, the term of this patent is extended or adjusted under 35 U.S.C. 154(b) by 657 days.

(21) Appl. No.: 11/986,391

(22) Filed: Nov. 21, 2007

(65) Prior Publication Data
US 2008/0136206 A1 Jun. 12, 2008

Related U.S. Application Data

(60) Provisional application No. 60/861,674, filed on Nov. 28, 2006.

(51) Int. Cl.
*B60P 3/40* (2006.01)

(52) U.S. Cl. .................... 296/26.09; 296/37.6

(58) Field of Classification Search ............... 296/26.08, 296/26.09, 37.1, 37.6, 184.1
See application file for complete search history.

(56) References Cited

U.S. PATENT DOCUMENTS

| | | | | | |
|---|---|---|---|---|---|
| 3,132,755 | A | * | 5/1964 | Greenslate | 414/522 |
| 4,838,605 | A | * | 6/1989 | Abromavage | 296/184.1 |
| 5,934,725 | A | * | 8/1999 | Bowers | 296/26.09 |
| 2005/0285422 | A1 | * | 12/2005 | Bartos et al. | 296/26.09 |
| 2006/0156672 | A1 | * | 7/2006 | Laurent et al. | 52/589.1 |

* cited by examiner

*Primary Examiner* — Joseph D Pape
(74) *Attorney, Agent, or Firm* — Boyd D. Cox

(57) ABSTRACT

A sliding cargo carrier for use in motor vehicles has a slideable frame assembly and deck for supporting cargo. The deck is supported on an upper frame which is slideably mounted on a base frame attached to the vehicle. The deck is extendable and retractable within the vehicle to allow easy access to cargo stored thereon. The slideable frame assembly can be readily removed and reinstalled in the vehicle. Additional storage assemblies selectively positioned on the slideable frame assembly increase the storage potential of the sliding cargo carrier.

16 Claims, 14 Drawing Sheets

SLIDING CARGO CARRIER FOR VEHICLE

Priority for this application is claimed from U.S. Provisional Application No. 60/861,674 entitled "Cargo Slide For Vehicle" filed on Nov. 28, 2006

BACKGROUND

The present invention is directed to a sliding cargo carrier for use in the storage bed or back of a vehicle. The deck for storing cargo is horizontally slideable and can be moved between an extended configuration and retracted configuration. The cargo carrier further includes additional storage devices that can be added onto the deck or removed from the deck as desired.

Some storage areas in a vehicle are difficult to access. These less accessible areas are typically located in the rear compartment of a vehicle, generally behind the cab of a truck and away from the rear doors of a van, SUV or delivery truck. To maneuver cargo into and out of these more remote areas is difficult and can necessitate crawling into and out of the vehicle when loading or unloading. The task can be cumbersome and time consuming when loading and unloading cargo from a vehicle. As a result, these less accessible storage areas are often left empty when hauling cargo, thereby diminishing the storage capability and efficiency of the vehicle.

Cargo carriers with moveable decks that can slide into and out of a vehicle are known in the prior art. These carriers are adapted for use in automotive vehicles. A moveable deck is typically mounted in the bed or back of the vehicle and can be extended and retracted from the vehicle. Cargo can be loaded onto the deck or unloaded from the deck when the deck is extended. Once loaded, the deck can be retracted into the vehicle. The moveable deck allows a user to readily access those areas of a vehicle that are difficult to reach. However, the cargo carriers of the prior art are permanently installed in the vehicle's storage bed and cannot be readily removed from the vehicle. Consequently, versatility of the vehicle is compromised with the carrier permanently installed in the vehicle's bed.

In addition, cargo carriers of the prior art are generally comprised of rail components that are loosely fitted together. These loosely fitted components are prone to vibrate and rattle against each other when the vehicle is in motion. The vibrations can create excessive noise that can be both dangerous and annoying for the driver and other occupants of the vehicle. Furthermore, the vibrations can cause unwanted wear and tear on the components, thereby decreasing the useful life of the cargo carrier.

Due to the arrangement of the components and the loose fittings of the sliding rails, the support decks of the prior art cargo carriers have an extension capability that is generally limited to less than half the length of the support deck. With such a small extension capability, access to the support deck for loading and unloading cargo is greatly limited. Therefore, with carriers of the prior art, it is difficult to readily access all of the area on the cargo deck's in the prior art.

In the sliding cargo carrier of the present invention, the close tolerances between the upper and lower rails allows the upper frame member and storage deck of the present invention to extend outwardly from a vehicle in which the carrier is installed for a distance of to up to 70% of the length of the deck. This allows a user easy access to the entire storage deck, so that cargo can be readily loaded and unloaded from the vehicle. Furthermore, the shape of the upper and lower rails and the engagement therebetween ensures that the sliding cargo carrier remains stable even when the storage deck is fully extended.

In the present invention, the slideable frame assembly including the deck, the base frame, and the sliding upper frame can be quickly removed from the bed of the vehicle when not needed and then readily reinstalled when desired. Since the sliding cargo carrier of the present invention can be quickly removed and installed in a vehicle, versatility of a vehicle's storage area can be greatly enhanced.

The interlocking panels comprising the deck can be readily disassembled. Along with the remaining components of the present invention, the panels of a sliding cargo carrier can be disassembled are sized to all fit into a standard sized container that can be shipped by conventional carriers, such as the United States Postal Service, Federal Express and United Parcel Service. This enables the sliding cargo carrier to be shipped at an economical cost.

The elements comprising the sliding cargo carrier are manufactured with close tolerances. In particular, the upper and lower rails are precision extrusions which decrease the play between the interlocked sliding rails. When the deck is moved or the vehicle is in motion, vibrations between components of the carrier are deterred which can reduce noise levels and also extend the useable life of the invention.

SUMMARY

The present invention is directed to a sliding cargo carrier which provides easily accessible storage in the bed of a motor vehicle. The device comprises a retractable cargo bed having a base frame on which an upper frame is slideably supported. The upper frame includes a deck for supporting cargo thereon. The sliding cargo carrier can be alternately moved between retracted and extended configurations. In the extended configuration, easy access to all areas of the deck is allowed. An auxiliary storage assembly includes receptacles that can be selectively positioned on the slideable frame assembly to increase the storage potential of the retractable storage deck.

It is an object of the present invention to provide a storage device for holding cargo in the back of a vehicle, such as a truck and van, wherein the storage device enables easy access to the cargo stored thereon.

It is a further object of the present invention to provide a sliding cargo carrier that can be retrofitted into the bed of a vehicle.

It is a further object of the present invention to provide a sliding cargo carrier with a slideable frame assembly that can be readily removed from a vehicle and readily reinstalled when desired.

It is a further object of the present invention to provide a sliding cargo carrier with a sliding cargo deck that can extend out of the a vehicle a distance of up to 70% of the deck's length.

It is a further object of the present invention to provide a lock assembly that deters extension of the slideable frame assembly beyond a selected position in order to inhibit overextending the frame assembly.

It is a further object of the present invention to provide a deck for a slideable frame assembly that comprises a plurality of interlocking panels that can be disassembled for shipping and storing.

It is a further object of the present invention to provide a sliding cargo carrier for a vehicle that creates a minimal amount of noises during use.

It is a further object of the present invention to provide a sliding cargo carrier comprising base and upper frames and having a close tolerance between the base and upper frames in order to decrease the vibrations therebetween.

BRIEF DESCRIPTION OF THE DRAWINGS

Reference is made to the accompanying drawings in which are shown illustrative embodiments of the invention and from which novel features and advantages will be apparent.

In FIG. 7A, the detent device is in the locked mode. In FIG. 7B, the detent device is in the unlocked mode.

DETAILED DESCRIPTION

Figure 1:
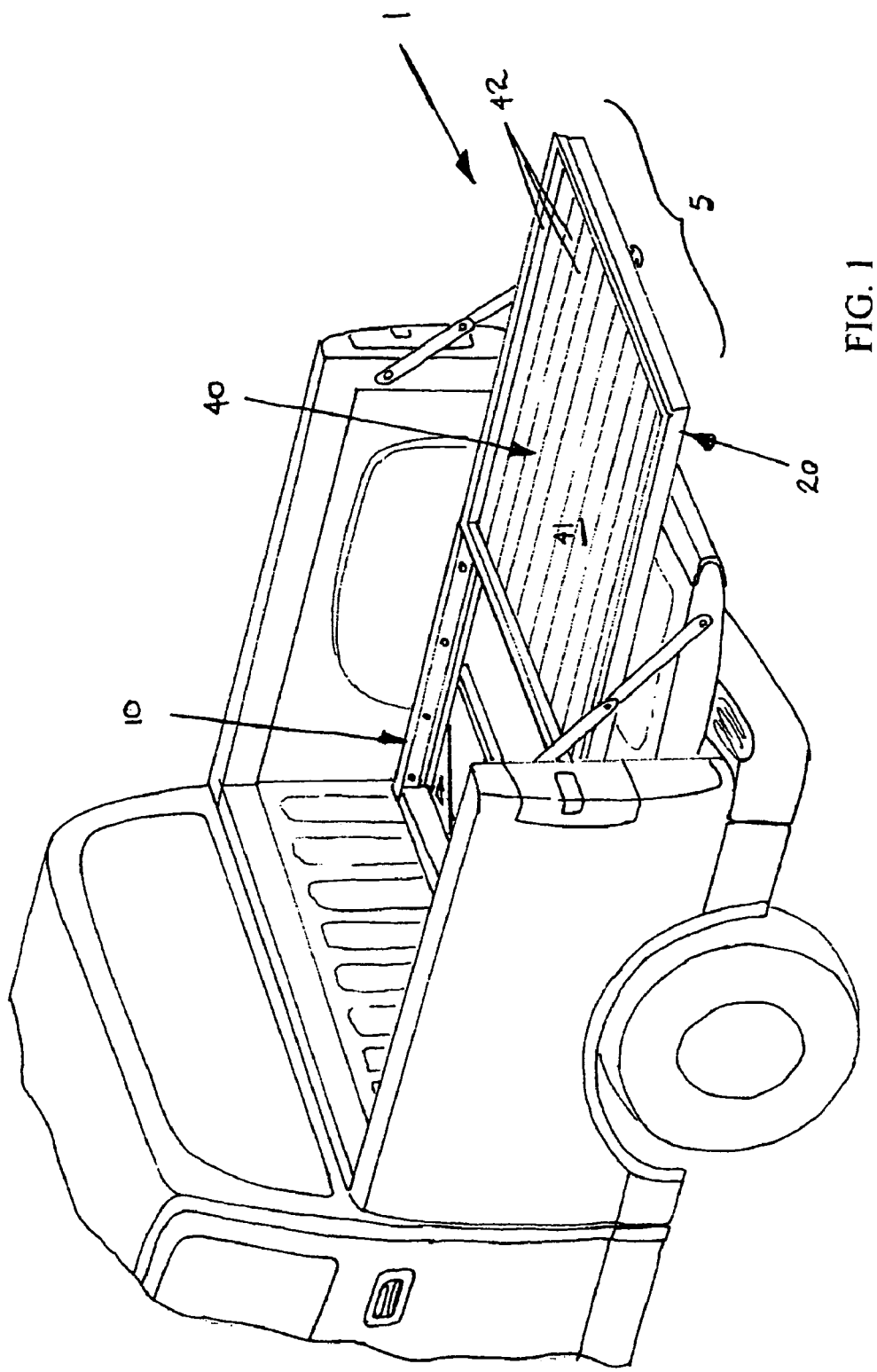
FIG. 1 is a perspective view of the sliding cargo carrier of the present invention installed in the bed of a vehicle and disposed in the extended configuration with the storage devices removed.

The sliding cargo carrier 1 shown in FIG. 1 comprises a slideable frame assembly 5, means for releasably attaching the slideable frame assembly to a vehicle, and means for additional storage. The slideable frame assembly 5 includes a base frame 10, an upper frame 20 and means for slideably mounting the upper frame on the base frame. A deck 40 is mounted on the upper frame 20.

The sliding cargo carrier 1 further includes means for locking the slideable frame assembly in a selected configuration.

Figure 2:
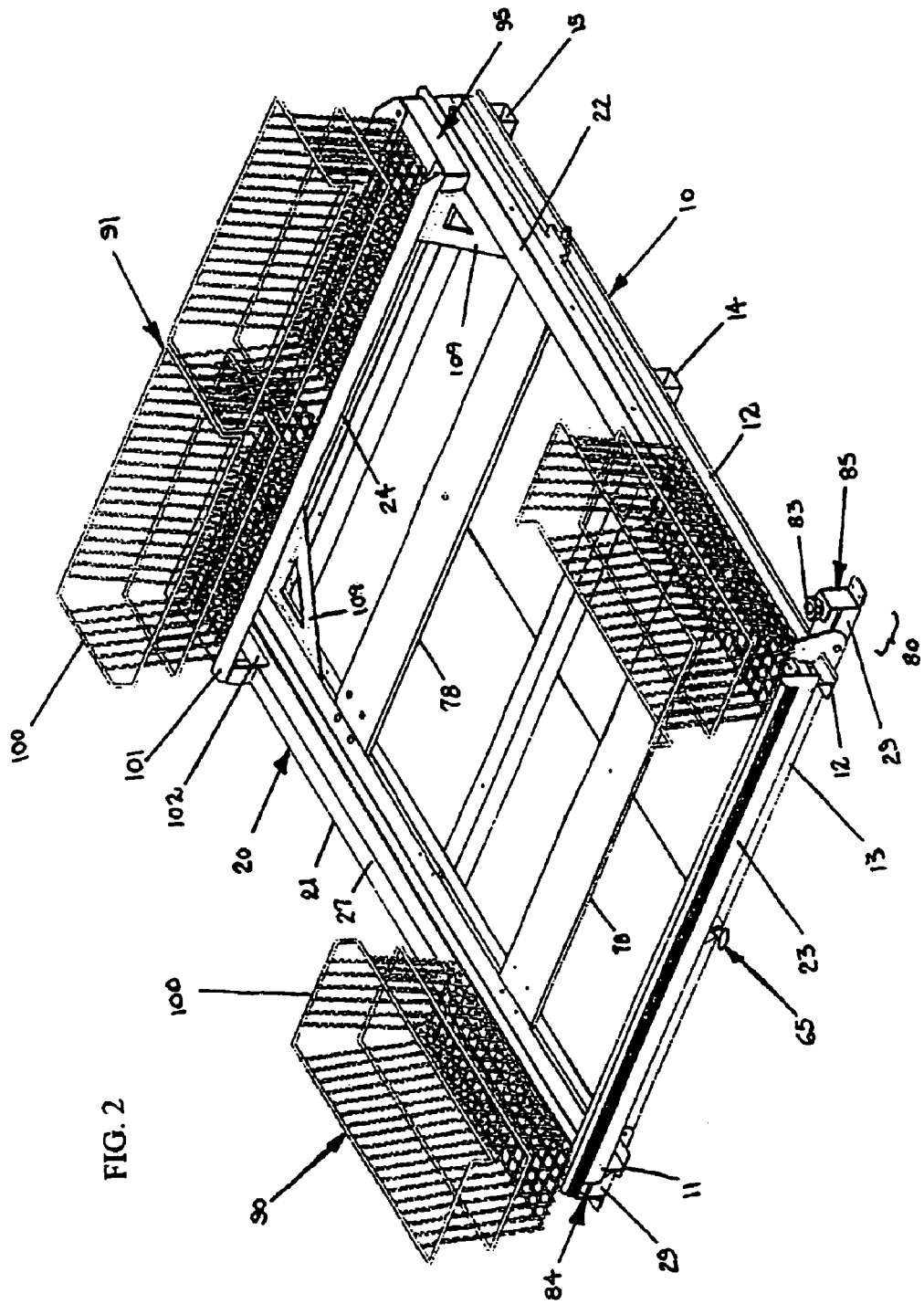
FIG. 2 is a top perspective of the sliding cargo carrier of FIG. 1 in the retracted configuration with the deck removed.

Referring to FIG. 2, the base frame 10 is formed by first 11 and second 12 lower rails that extend parallel to each other. Crossing the lower rails 11,12 in a generally perpendicular orientation are the front 13, middle 14, and rear 15 transverse members. The transverse members 13,14,15 extend generally parallel to each other. The front transverse member 13 includes a holddown portion 29 disposed on each end thereof.

The upper frame 20 includes first 21 and second 22 upper rails and fore 23 and aft 24 cross members. A plurality of transverse support bars 78 and a pair of braces 109 are included on the upper frame 20. The transverse support bars 78 and braces 109 provide additional reinforcement for the upper frame 20.

The fore 23 and aft 24 cross members and the transverse support bars 78 are generally parallel to each other and generally perpendicular to the upper rails 21,22. Each of the first 21 and second 22 upper rails extend generally parallel to each other.

The second upper rail 22 is a mirror image of the first upper rail 21. Therefore, it should be noted that the elements of both the first 21 and second 22 upper rails are represented by the upper rail shown in FIGS. 7A and 7B. Similarly, the first 11 and second 12 lower rails are mirror images of each other, also shown in FIGS. 7A and 7B.

Each upper rail 21, 22 includes an upper supporting guide 27, a guide wall 26, and a base 25. The upper supporting guide 27 extends outwardly from one end of the respective guide wall 26. A base 25 extends outwardly from an opposite end of each respective guide wall 26.

The means for slideably mounting the upper frame on the base frame is a slide assembly 30. The slide assembly 30 includes a plurality of rollers 31 and a pair of roller guides 32.

Figure 4:
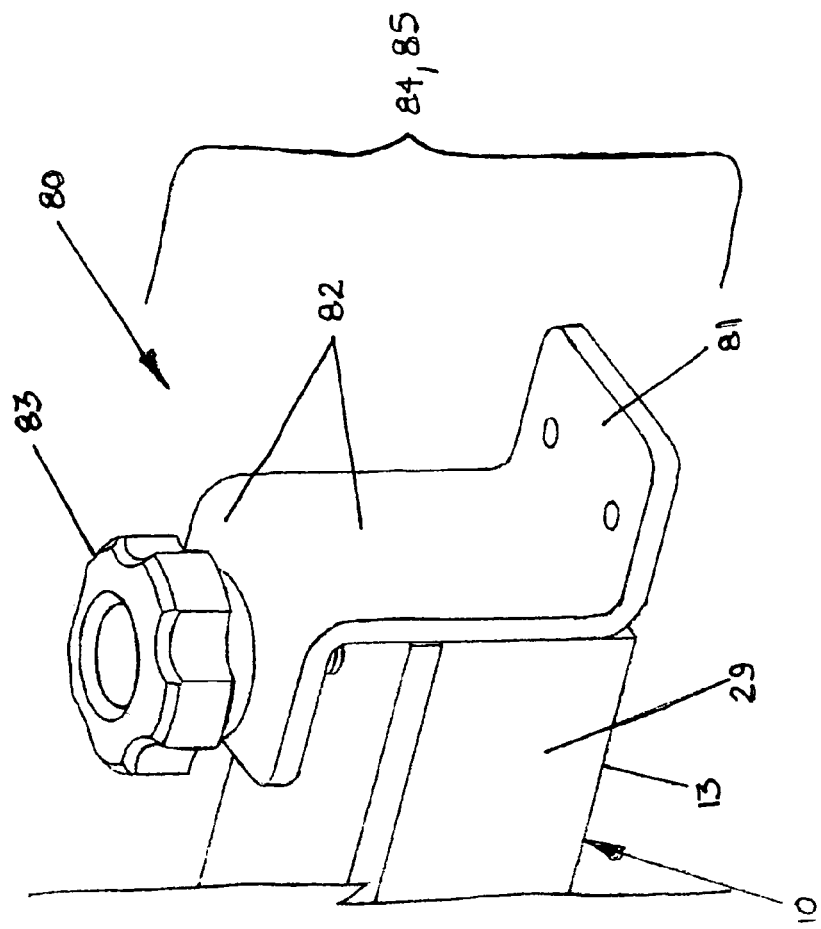
FIG. 4 is a partial front perspective view of the right front side of the sliding cargo carrier of FIG. 1 showing the frame securing assembly engaging the holddown portion on the base frame.

The means for releasably attaching the slideable frame assembly to a vehicle is a frame securing assembly 80, as shown in FIG. 4. The frame securing assembly 80 is comprised of left 84 and right 85 releasable clamps. The left 84 and right 85 releasable clamps are mirror images of each other. Therefore, the left releasable clamp 84 is a reversal of the right releasable clamp 85 shown in FIG. 4. Each of said left 84 and right 85 releasable clamps has a vehicle attaching portion 81, a frame receiving portion 82, and a holddown screw 83. The holddown screw 83 is threadedly engaged with a respective frame receiving portion 82 on each of the releasable clamps 84,85.

Figure 6:
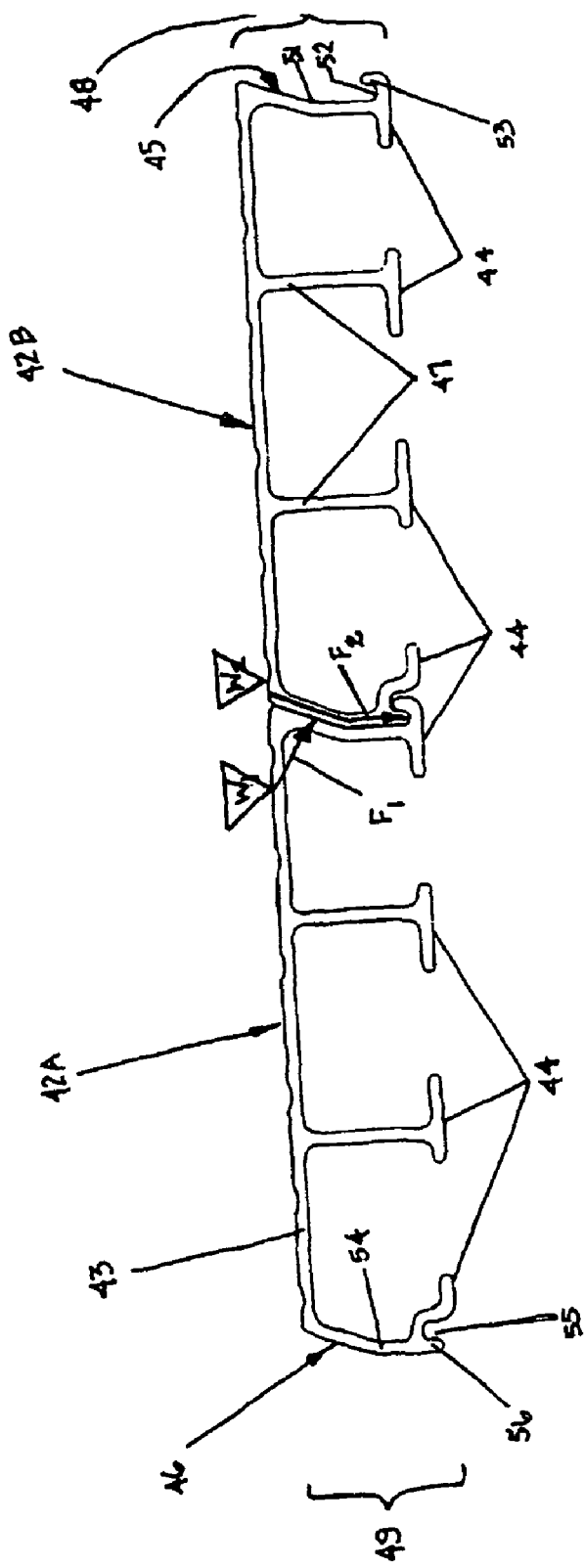
FIG. 6 is a cross sectional view of two interlocking panels comprised by the deck of the sliding cargo carrier of FIG. 1.

On the upper frame 20, the deck 40 is a planar structure having an upper support surface 41, as shown in FIGS. 1 and 6. The deck 40 is comprised of a plurality of interlocking panels 42. Each of the panels 42 has a top 43, a bottom 44, and first 45 and second 46 sides. A plurality of ribs 47 extends between the top 43 and bottom 44 of each panel 42. The first 45 and second 46 sides include means for interlocking the panels.

The means for interlocking the panels is an interlocking joint which comprises first 48 and second 49 interlocking elements. The first interlocking element 48 is on the first side 45 of each panel and includes a first curvature 51, a first groove 52, and an upward protuberance 53. The upward protuberance 53 and first groove 52 extend along a lower edge of the first side 45.

The second interlocking element 49 is on the second side 46 of each panel 42 and is comprised by a second curvature 54, a second groove 55, and a downward protuberance 56. The downward protuberance 56 and second groove 55 extend along a lower edge of the second side 46 on each panel 42.

Figure 8:
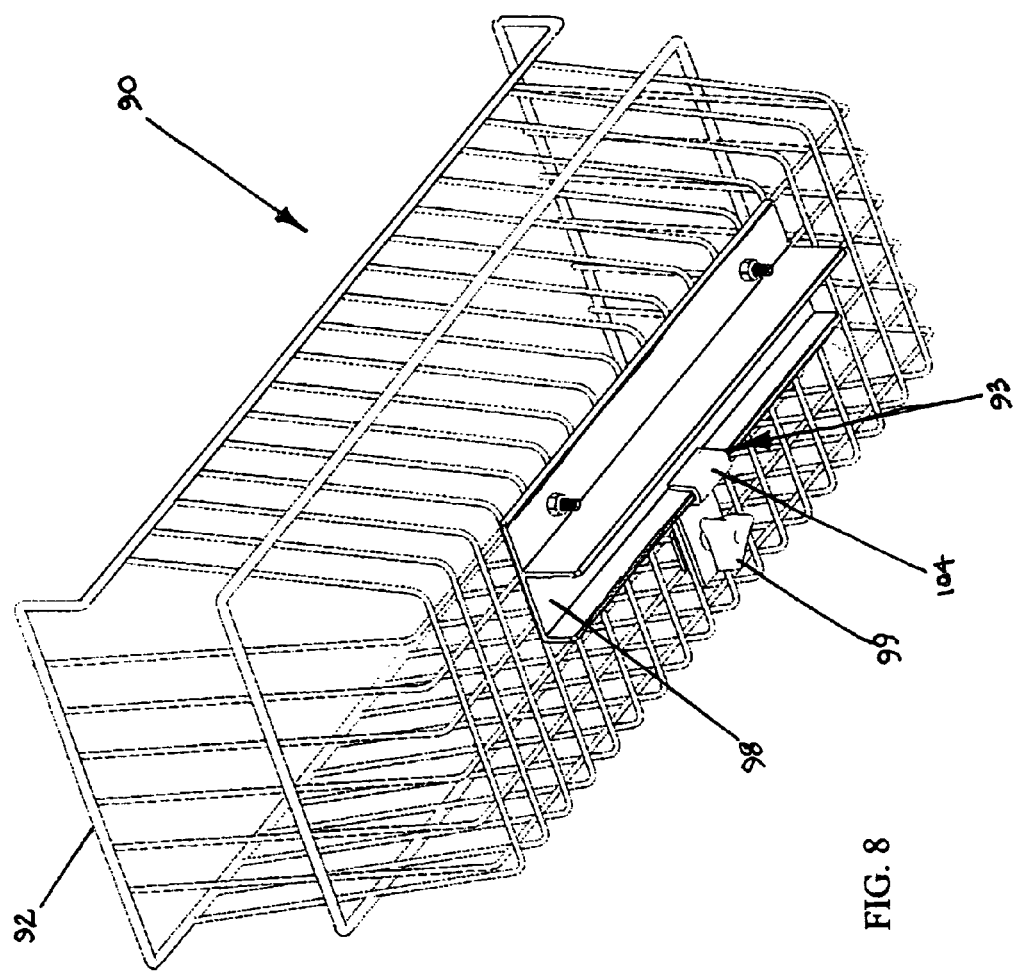
FIG. 8 is a bottom perspective view of the first storage device of the sliding cargo carrier shown in FIG. 2.
Figure 9:
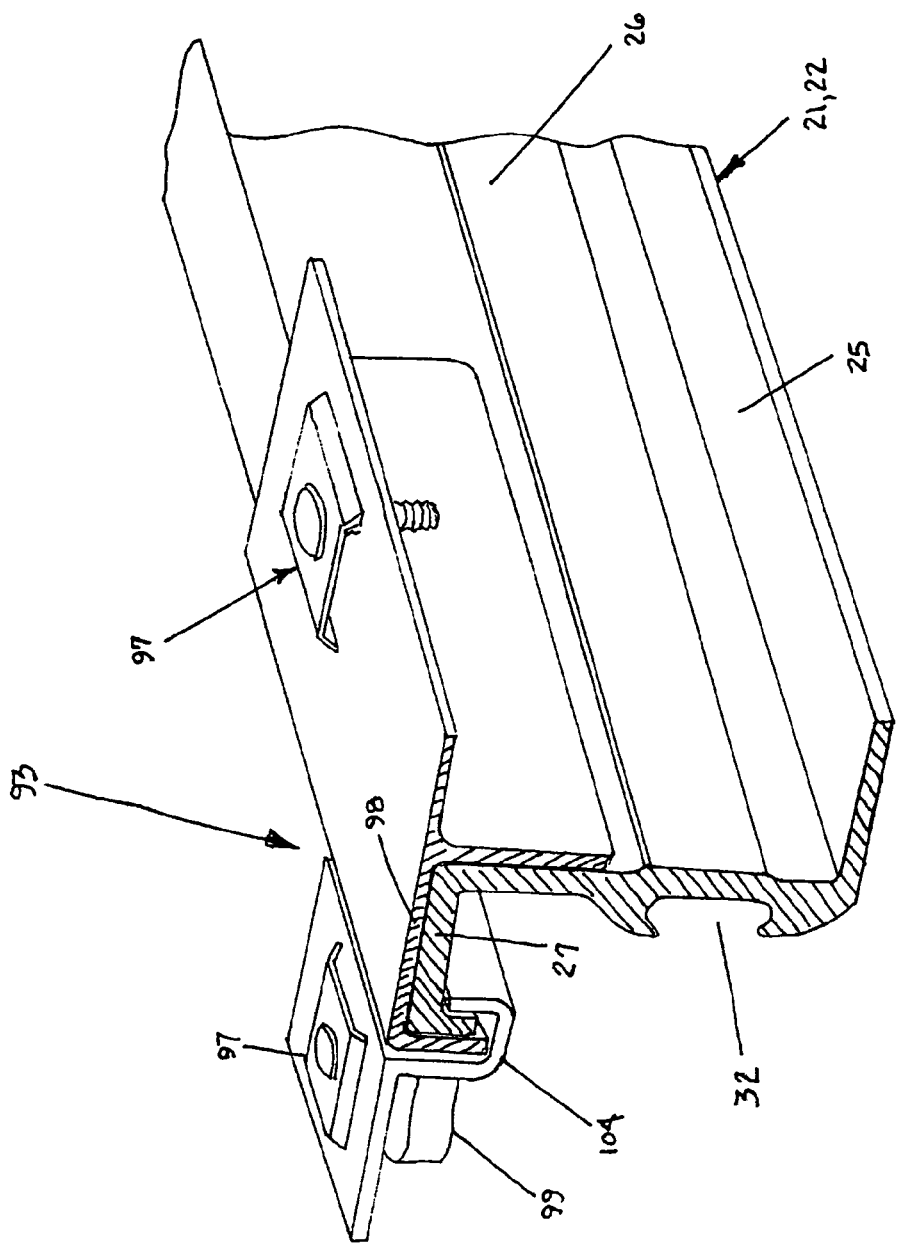
FIG. 9 is a cross-sectional perspective view of the first mounting bracket and the first lower rail of the upper frame comprised by the sliding cargo carrier of FIG. 2.

In a first preferred embodiment shown by FIG. 2, means for additional storage is an auxiliary storage assembly 100. The storage assembly 100 includes first 90 and second 91 storage devices. The first storage device 90 as shown in FIGS. 8 and 9 includes a side storage receptacle 92 and a first mounting bracket 93 for securing the side storage receptacle 92 to the upper frame 20. The first mounting bracket 93 has a frame engaging portion 98 and a clamping jaw 104 which includes a set screw 99 and a plurality of side receptacle clamps 97. The set screw 99 comprised by the clamping jaw 104 secures the frame engaging portion 98 to the upper frame 20 of the sliding cargo carrier 1. The plurality of side receptacle clamps 97 secures the side storage receptacle 92 to the first mounting bracket 93.

Figure 10:
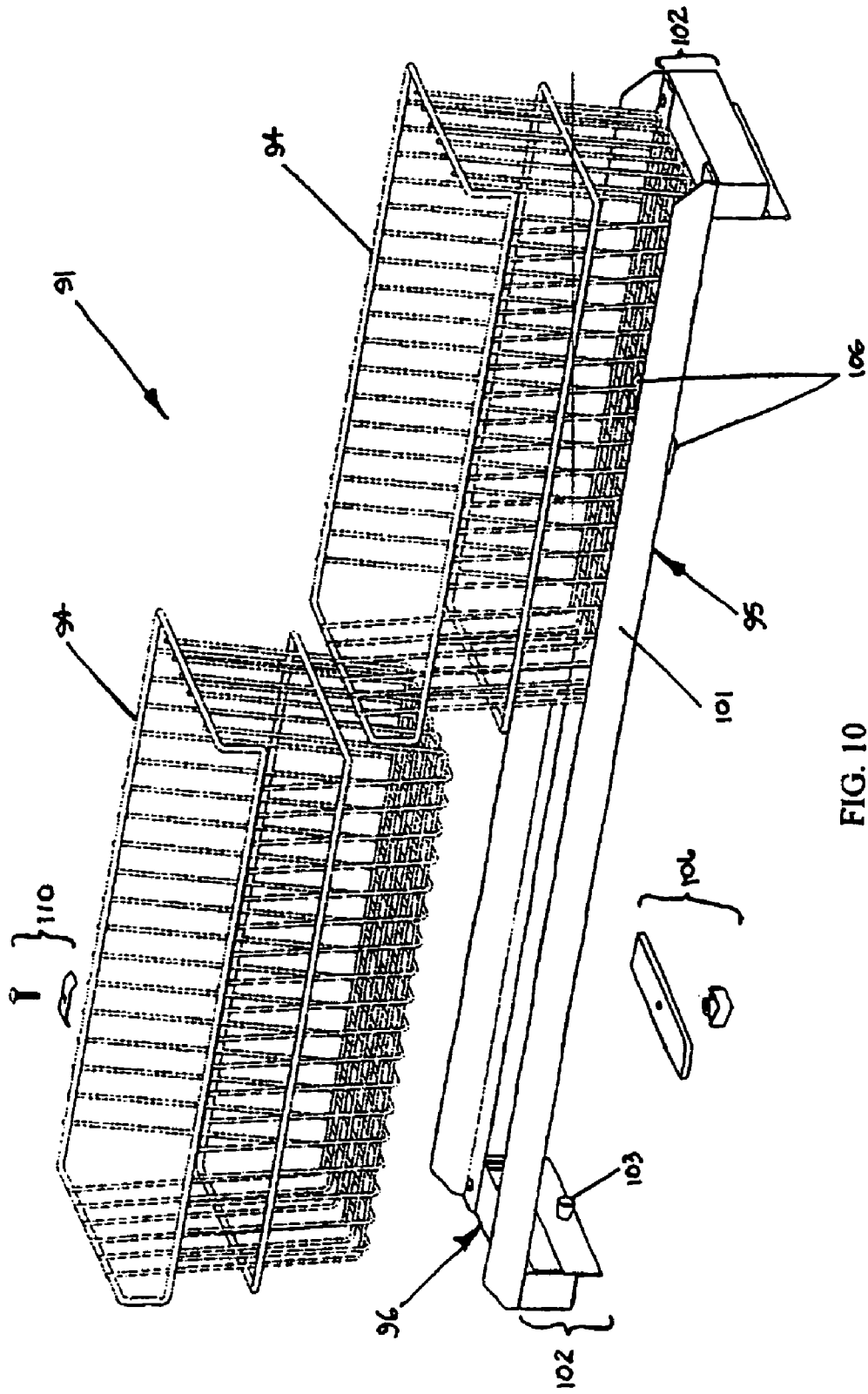
FIG. 10 is a partially exploded perspective view of a preferred embodiment of the second storage device of the present invention shown in FIG. 2.

The second storage device 91 in FIGS. 2 and 10 includes a plurality of cross storage receptacles 94 and a second mounting bracket 95. In a preferred embodiment, the second storage device 91 has two cross storage receptacles 94. However, the size and number of storage receptacles can vary as desired.

The second mounting bracket 95 has a frame clamp 96 for releasably securing the second storage device 91 to the upper frame 20 and a plurality of cross receptacle clamps 110 for attaching the cross storage receptacles 94 to the second mounting bracket 95. The frame clamp 96 is formed by a transverse support piece 101 and a pair of rail clamps 102. The rail clamps 102 releasably secure the second storage device 91 to the first 21 and second 22 upper rails of the upper frame 20.

Figure 5:
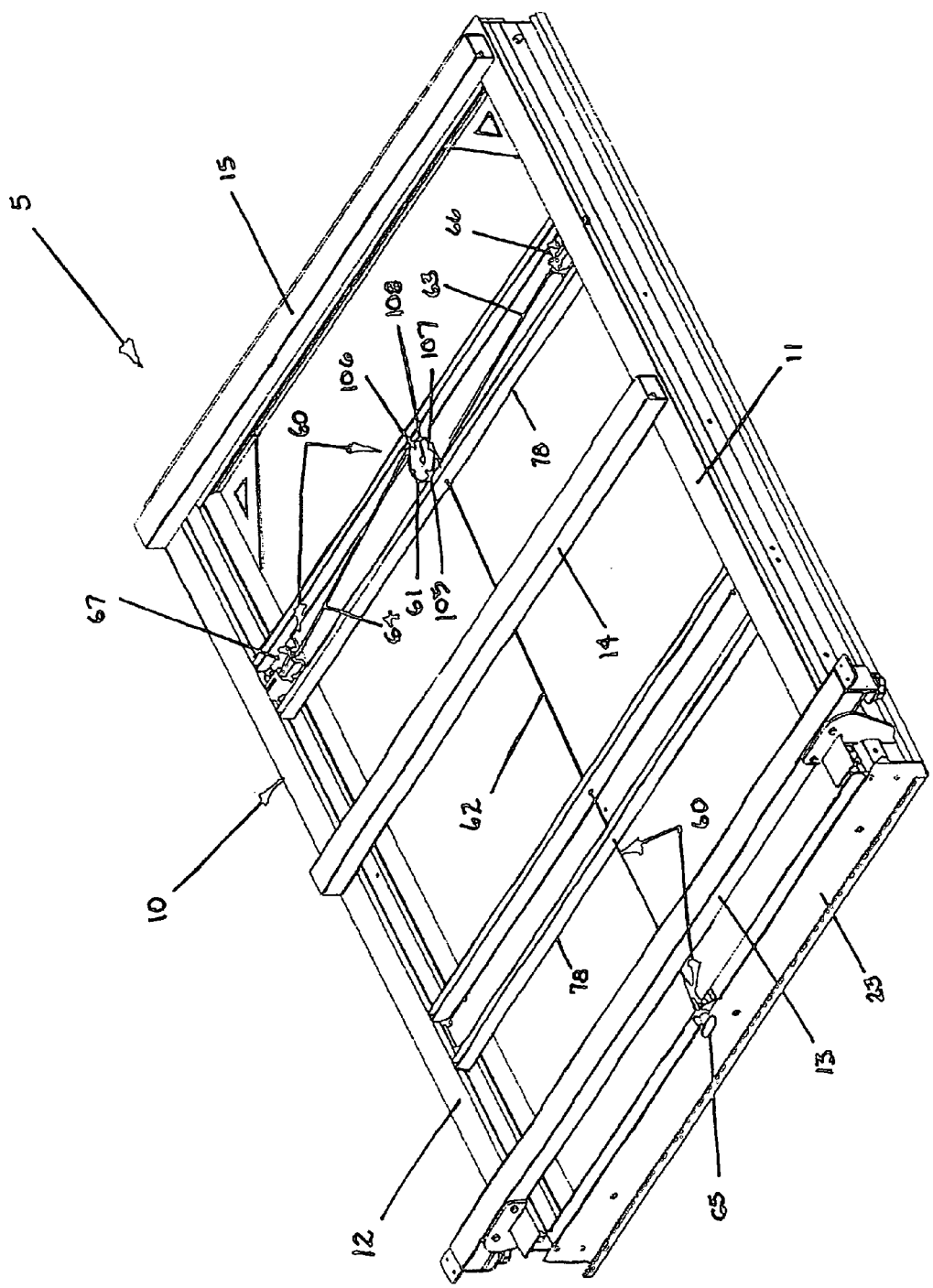
FIG. 5 is a bottom perspective view of the slideable frame assembly with the deck removed and the frame securing assembly of the sliding cargo carrier of FIG. 1 in the retracted configuration.
Figure 7A:
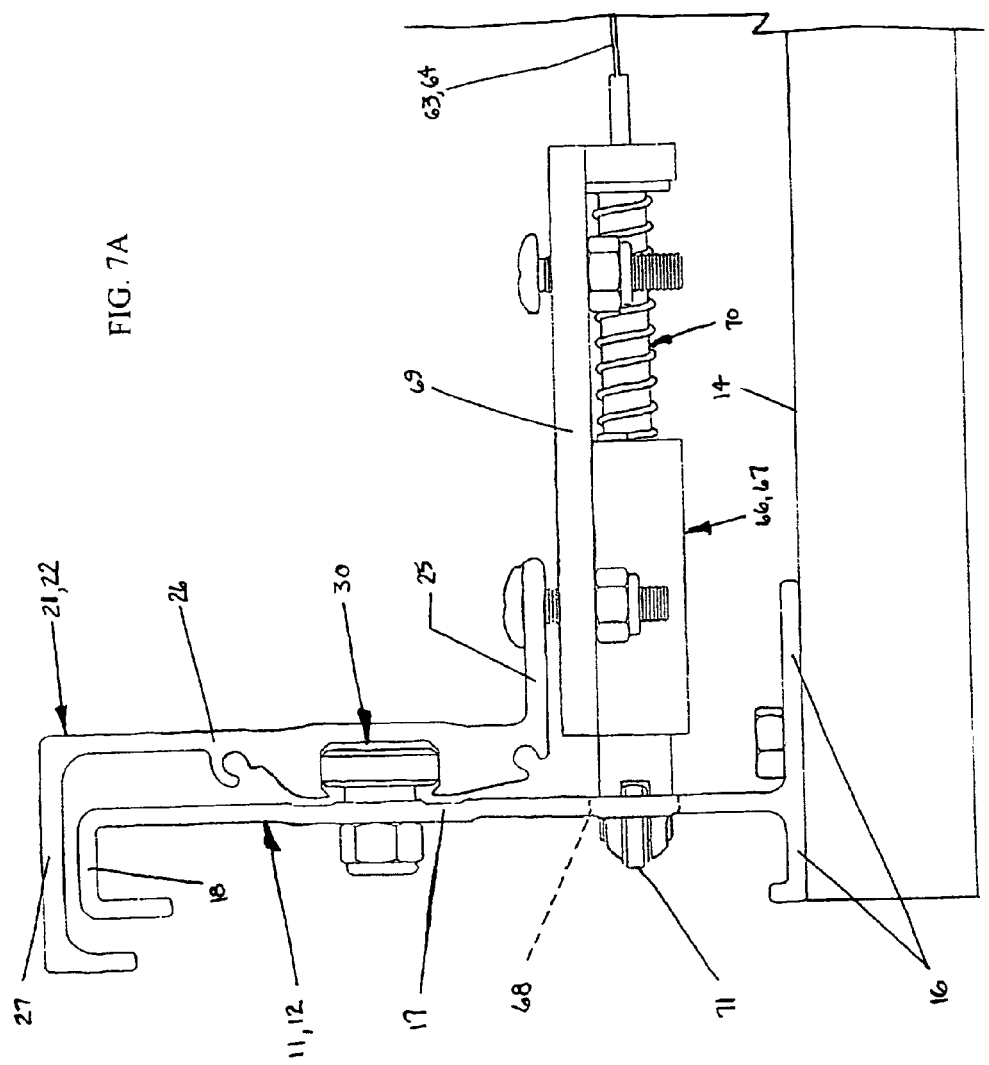
FIGS. 7A and 7B show a planar front view of part of the lock assembly of the sliding cargo carrier of FIG. 1.
Figure 7B:
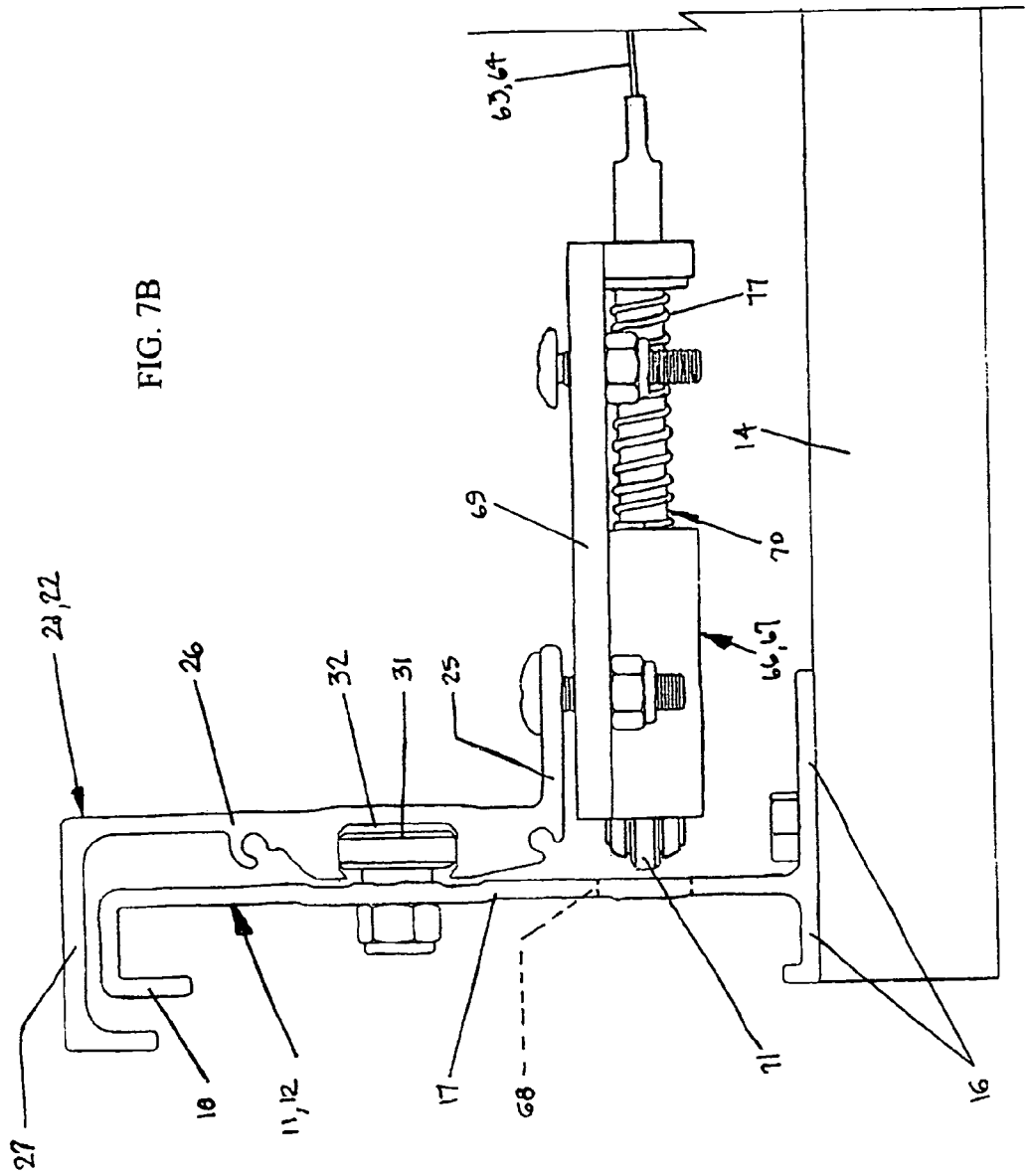

The means for locking the slideable frame assembly in a selected configuration is a lock assembly 60 as shown in FIGS. 5, 7A and 7B. The lock assembly 60 comprises a detent actuator mechanism which includes an actuating plate 61, a primary actuating cable 62, first 63 and second 64 detent cables, and a handle 65. Further comprised by the lock assembly 60 are first 66 and second 67 detent devices and a plurality of locking apertures 68 disposed in the first 11 and second 12 lower rails of the base frame 10.

Figure 11:
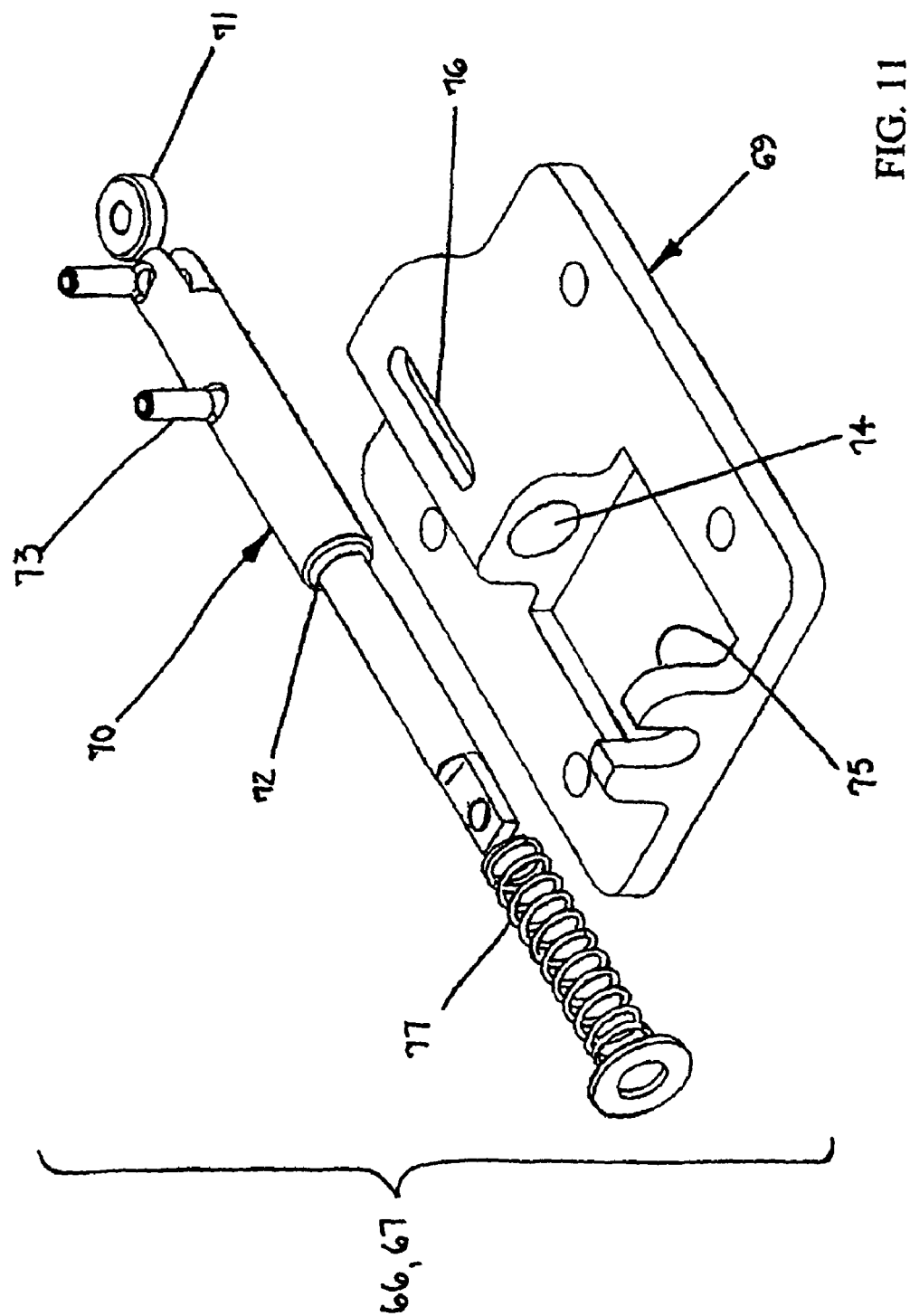
FIG. 11 is an exploded top perspective view of one of the detent devices of the present invention shown in FIG. 2.

The first 66 and second 67 detent devices are mirror images of each other. Therefore, the following description of the first detent device 66 is also descriptive of the second detent device 67. Referring to FIG. 11, each of the detent devices 66,67 comprises a mounting plate 69, a locking pin 70 and a spring 77. The locking pin 70 is elongated with a wheel 71 rotatably positioned on one end, a shoulder 72 disposed on a midsection of the pin's length, and a guide projection 73. The guide projection 73 is a protuberance that extends outwardly from a side of the locking pin 70. The mounting plate 69 has a channel 74 and a stop 75. A guide slot 76 extends along the length of the channel 74.

On the base frame 10, each of the first 11 and second 12 lower rails have a generally J-shaped cross sectional shape as shown in FIG. 7A. The particular cross sectional shape of each lower rail 11,12 is formed by a foot 16, sidewall 17 and downward hook 18. In a preferred embodiment, the front 13, middle 14, and rear 15 transverse members in FIG. 2 each have a generally rectangular cross sectional shape. With the lower rails 11,12 extending generally perpendicular to the transverse members 13,14,15, the base frame 10 has a generally rectangular shape.

The upper frame 20 is also generally rectangular in shape and preferably conforms somewhat to the size and shape of the base frame 10.

Figure 3:
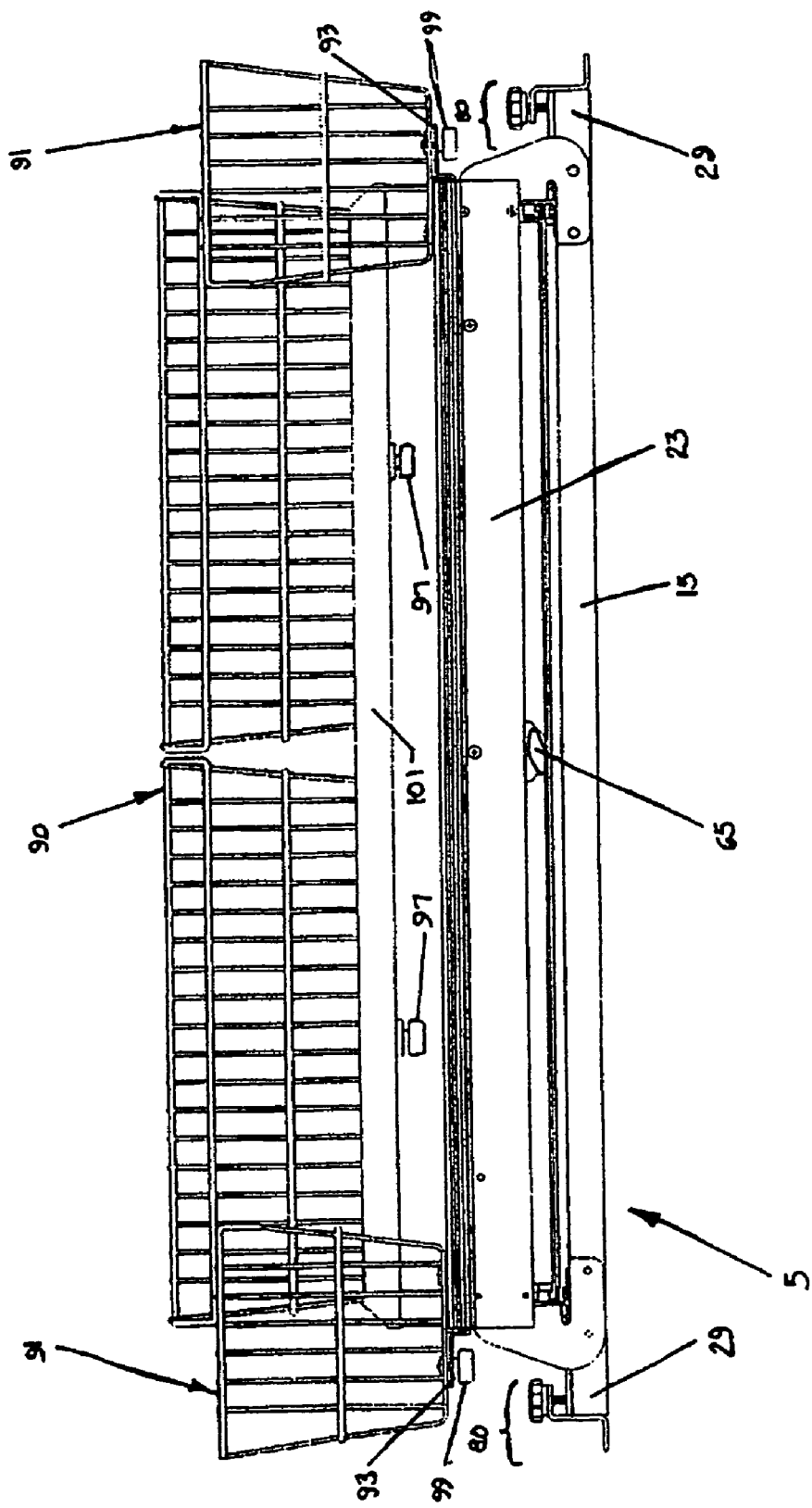
FIG. 3 is a front planar view of the sliding cargo carrier of FIG. 1.

Referring to FIGS. 3, 7A and 8, the first mounting bracket 93 of the first storage device 90 has a generally T-shaped cross section. The first mounting bracket 93 overlays the upper supporting guide 27 of a respective upper rail 21,22. The set screw 99 on the first mounting bracket 93 can be tightened to lock the clamping jaw 104 to the upper supporting guide 27 and thereby secure the first storage device 90 to the upper frame 20. The first mounting bracket 93 allows the first storage device 90 to be selectively position and locked in position on the upper frame 20 of the slideable frame assembly 5.

The second mounting bracket 95 of the second storage device 91 is generally U-shaped as shown in FIG. 2 and is comprised by the transverse support piece 101 and rail clamps 102. Each of the rail clamps 102 are disposed on opposite ends of the transverse support piece 101 and include a locking screw 103. The rail clamps 102 are releasably secure the second storage device 91 at selected positions on the upper frame 20. The first 90 and second 91 storage devices can be added onto or removed from the slideable frame assembly 5 as desired by a user.

On each of the left 84 and right 85 releasable clamps of the frame securing assembly 80 in FIGS. 2 and 4, the vehicle attaching portion 81 is planar and the frame receiving portion 82 is L-shaped. The vehicle attaching portion 81 extends outwardly from the frame receiving portion 82 giving the frame securing assembly 80 a generally Z-shaped appearance. Each of the holddown screws 83 extends through a respective frame receiving portion 82.

In the preferred embodiment of FIGS. 1 and 6, the interlocking panels 42 of the deck 40 are comprised of precision-extruded aluminum. Likewise, the base frame 10 and upper frame 20 are also comprised of precision-extruded aluminum. Although the panels 42 and frames 10,20 are preferably made of aluminum, other suitable materials including lightweight metals, composites or plastics, could be used instead. The precision-extrusion allows for close tolerances between the components of the sliding cargo carrier 1, which is particularly beneficial for the moveable components. The close tolerances deter vibrations which inhibits attendant noises and also inhibits wear and tear on the sliding cargo carrier 1.

The base frame 10 supports the upper frame 20 on the installation vehicle. The upper frame 20 is moveable relative to the base frame 10 and can be moved into and out of the vehicle bed by a sliding motion. The upper support surface 41 of the deck 40 provides a space on the sliding cargo carrier 1 for holding cargo. Means for interlocking the panels secure adjacent panels 42 to one another to form the deck 40. The tops 43 of the interlocking panels 42 cooperate to form the upper support surface 41 of the assembled deck 40.

The engagement between the first 48 and second 49 interlocking elements on the sides 45, 46 of two adjacent, engaged panels 42 provides an interlocking joint. The strength of the interlocking joint is enhanced by downward forces created when a load is placed on the upper support surface 41 of the deck 40. In addition, the ribs 47 provide lightweight reinforcement for strengthening the load capacity of the deck 40.

Referring to FIGS. 7A and 7B, the guide walls 26 and upper supporting guides 27 on the upper rails 21,22 cooperate with the lower rails 11,12 and maintain alignment between the upper 20 and base 10 frames. In addition, the cooperation between the roller guides 32 and the rollers 31 facilitates the sliding movement between the upper frame 20 and the base frame 10. As the rollers 31 move across the roller guides 32, the upper frame 20 is carried horizontally across the base frame 10.

The frame securing assembly 80 of FIG. 4 releasably secures the sliding cargo carrier 1 to a vehicle by directly clamping the base frame 10 onto the vehicle. The sliding cargo carrier 1 is preferably mounted in the back or bed of the vehicle. The holddown screw 83 on the frame securing assembly 80 can be selectively engaged with the front transverse member 13 of the base frame 10 to secure the slideable frame assembly 5 onto the bed of the vehicle. Conversely, the holddown screw 83 can be loosened and disengaged from the front transverse member 13 whereby the slideable frame assembly 5 can then be removed from the vehicle's bed.

The first 90 and second 91 storage devices provide additional cargo storage on the upper frame 20 as shown in FIGS. 2 and 8-10. On the first storage device 90, the first mounting bracket 93 releasably attaches the side storage receptacle 92 to the upper frame 20 at selected positions on the upper rails 21,22. When the frame engaging portion 98 of the first mounting bracket 93 is released, the first storage device 90 can be removed from the upper frame 20.

Regarding the second storage device 91, the second mounting bracket 95 attaches the cross storage receptacles 94 to the upper frame 20. The second mounting bracket 95 supports the cross storage receptacles 94. Alternatively, the second storage device 51 can be removed from the upper frame 20. Each of the two rail clamps 102 comprised by the frame clamp 96 of the second mounting bracket 95 releasably attaches to a respective upper rail 21,22 on the upper frame 20. Therefore, the second mounting bracket 95 can be secured in selected positions on the upper rails 21,22, or can be removed from the upper frame's upper rails 21,22.

The lock assembly 60 releasably secures the upper frame 20 at various selected positions along the base frame 10. By engaging the locking apertures 68 in the sidewalls 17 of the base frame's lower rails 11,12, the locking pins 70 can selectively secure the upper frame 20 to the base frame 10. This substantially inhibits relative horizontal movement between the upper 20 and base 20 frames. On each of the locking pins 70, the wheel 71 facilitates alignment of the base frame 10 with the upper frame 20. The wheels 71 facilitate the sliding movement between the base 10 and upper 20 frames, assist in maintaining horizontal alignment of the frames 10,20, and decrease vibrations between the upper 20 and base 10 frames to inhibit noise levels.

The detent actuator mechanism provides an interface for the user to manipulate the lock assembly 60 between its lock and unlocked modes. By pulling the handle 65 forward in a direction away from the upper frame 20, the detent actuator mechanism is activated to disengage the locking pins 70 from their respective locking apertures 68. This releases the lock assembly 60 and the upper frame 20 is free to slide on the base frame 10.

Specifically, when the handle 65 is pulled forward, the actuating plate 61 is rotated via the primary actuating cable 62. As it rotates, the actuating plate 61 exerts a pulling force on the first 63 and second 64 detent cables which in turn pulls on the attached locking pins 70 of the respective first 66 and second 67 detent devices. The locking pins 70 are pulled inwardly in a direction away from the adjacent lower rails 11,12.

When no force is being applied to the handle 65, the springs 77 of the respective detent devices 66,67 urge the locking pins 70 outwardly in a direction toward the most proximate lower rail 11,12 of the base frame 10. When the locking pins 70 are urged outwardly, the wheel 71 of each locking pin 70 can either engage locking apertures 68 in the sidewalls 17 of the respective lower rails 11,12 or rest against the sidewalls 17 of the respective lower rails 11,12. When the handle 65 is pulled with enough force to overcome the bias of the springs 77, the locking pins 70 are drawn inwardly in a direction away from the respective proximate lower rails 11,12 and out of engagement with the locking apertures 68. With the locking pins 70 disengaged from the locking apertures 68, the upper frame 20 is free to slide on the base frame 10. Also, with the wheels 71 of the locking pins 70 engaging the sidewalls 17, the upper frame 20 is free to slide on the base frame 10.

The upper frame 20 is supported on the base frame 10. As such, the first 21 and second 22 upper rails are supported respectively on the first 11 and second 12 lower rails. Referring to FIG. 7B, the upper supporting guide 27 on each of the upper rails 21,22 overlays the downward hook 18 on the respective cooperating lower rail 11,12. The roller guides 32 disposed on the respective guide walls 26 on the first 21 and second 22 upper rails of the upper frame 20 rest on the rollers 31 disposed on the respective first 11 and second 12 lower rails of the base frame 10. Consequently, the upper frame 20 can readily be moved by sliding it horizontally across the base frame 10.

The deck 40 in FIG. 1 is comprised by a plurality of interlocking panels 42 adjoined by the means for interlocking the panels in a side by side arrangement. The means for interlocking the panels is a plurality of interlocking joints. Each interlocking joint connects adjacent panels 42A,B together as shown by example in FIG. 6 to form the assembled deck 40. Therefore, when the deck 40 is assembled, the first side 45 of one panel 42A is interlocked with the second side 46 of an adjacent panel 42B and the panels 42A,B are interlocked in a series.

To connect a first 45 and second 46 side of two adjacent panels 42A,B, the first 51 and second 54 curvatures of two adjacent panels 42A,B are nested together, the upward protuberance 53 of one panel's first side 45 is inserted into the second groove 55 of the other panel's second side 46, and the first groove 52 on the one panel's first side 45 receives the downward protuberance 56 of the other panel's second side 46.

The interlocking joint between two connected panels 42 transfers the weight of a load placed on the deck via two main pathways. For example, a portion of the load $W_1$ on panel 42A transfers a downward force $F_1$ through the first side 45 of the panel 42A to the second side 46 of the adjacent panel 42B. A portion of the load $W_2$ on panel 42B transfers a downward force $F_2$ through the second side 46 and into the first groove 52 on the first side 45 via the downward protuberance 56. With this arrangement each of the interlocking joints provides a connection between the panels 42 that actively resists the forces created by the weight of cargo resting on the upper support surface 41 of the deck 40.

Referring to FIG. 4, the vehicle attaching portion 81 of each left 84 and right 85 releasable clamp on the frame securing assembly 80 is attached to a vehicle by bolts, screws, rivets or other suitable attachments. The frame receiving portion 82 extends outwardly from the vehicle attaching portion 81. When the sliding cargo carrier 1 is installed in a vehicle, the frame receiving portion 82 overlays the respective holddown portion 29 on the outer ends of the front transverse member 13. The holddown screws 83 are tightened against the respective holddown portions 29 to secure the base frame 10 onto the vehicle.

The lock assembly 60 is mounted on the slideable frame assembly 5 as shown in FIG. 5. The first detent device 66 is positioned on one end of one of the transverse support bar 78 and the second detent device 67 is positioned on the opposite end of the transverse support bar 78. The actuating plate 61 is mounted on the transverse support bar 78 by a pivotal attachment 108. The pivotal attachment 108 is positioned on a midsection of the transverse support bar 78 between the detent devices 66,67.

The actuating plate 61 is characterized by first 105, second 106 and primary 107 anchor points. The first 105 and second 106 anchor points are substantially collinear with the pivotal attachment 108. The primary anchor point 107 is offset from a line extending through the first anchor point 105, the second anchor point 106, and the pivotal attachment 108.

The handle 65 of the lock assembly 60 is slideably mounted on the fore cross member 23 of the upper frame 20. The primary actuating cable 62 is attached at one end to the handle 65 and is attached at the other end to the primary anchor point 107 on the actuating plate 61. The first 63 and second 64 detent cables are respectively attached at one of their ends to the first 105 and second 106 anchor points on the actuating plate 61. The other end of the first detent cable 63 is attached to the locking pin 70 on the first detent device 66 and the other end of the second detent cable 64 is attached to the locking pin 70 on the second detent device 67.

On each of the detent devices 66,67 shown in FIGS. 5, 7A and 11, the locking pin 70 is mounted in the channel 74 on the mounting plate 69. The guide projection 73 on the locking pin 70 is slideably disposed in the guide slot 76 of the channel 74. One end of each locking pin 70 extends outwardly from the respective channel 74 and rests in the outward arms of the respective stop 75. The first 63 and second 64 detent cables are attached to the ends of the respective locking pins 70 resting on the stop 75. On each of the mounting plates 69, the spring 77 is held in compression between the locking pin's shoulder 72 and the stop 75. Each of the mounting plates 69 on the first 66 and second 67 detent devices is secured to the guide wall 26 of the respective first 21 and second 22 upper rails.

The first storage device 90 in FIGS. 2, 8 and 9 is adapted to be supported at selected positions on the upper frame 20. The first mounting bracket 93 attaches to the upper rails 21,22. When attached, the frame engaging portion 98 of the first mounting bracket 93 overlays the upper supporting guide 27 of the respective upper rail 21,22. A set screw 99 releasably secures one of the receptacle clamps 97 to the first mounting bracket 93 and releasably locks the clamping jaw 104 of the first mounting bracket 93 onto the guide wall 26 of an upper rail 21,22.

The second storage device 91 as shown in FIGS. 2 and 10 is also mounted on the upper frame 20. The frame clamp 96 of the second mounting bracket 95 spans the upper frame 20 and engages the first 21 and second 22 upper rails. When installed, each of the rail clamps 102 are adjacent to the upper supporting guide 27 of each respective first 21 and second 22 upper rail. The locking screw 103 extends through a respective rail clamp 102 and engages the upper rail 21,22 to lock the second storage device 91 on the upper frame 20. The second storage device 91 can be moved to various selected positions by releasing the rail clamps 102, sliding the second mounting bracket 95 along the length of the upper frame's upper rails 21,22 and securing the rail clamps 102.

The sliding cargo carrier 1 is sized to fit into a vehicle, such as into the bed of a pick-up truck. Alternatively, the sliding cargo carrier 1 could be suitably sized for installation in the back of a van, sport utility vehicle, delivery truck or other desired vehicles.

The sliding cargo carrier 1 of the present invention has extended and retracted configurations, as shown in FIGS. 1 and 2, respectively. In the retracted configuration, the upper frame 20 is generally centered over the base frame 10 so that the upper frame 20 is substantially aligned vertically with the base frame 10.

Specifically, the rear transverse member 15 of the base frame 10 is generally aligned vertically with the aft cross member 24 of the upper frame 20 and the front transverse member 13 is generally aligned vertically with the fore cross member 23. Furthermore, when installed the upper frame 20 is preferably fully contained within the vehicle when retracted.

In the extended configuration of a preferred embodiment, the upper frame 20 is vertically offset from the base frame 10, so that at least a portion of the upper frame 20 extends beyond the front transverse member 13 of the base frame 10. As such, the front 13 and rear 15 transverse members of the base frame 10 are vertically offset from the respective fore 23 and aft 24 cross members of the upper frame 20. When the sliding cargo carrier 1 is installed in a vehicle, up to about 70% of the upper frame 20 can be extended beyond the confines of the vehicle.

The lock assembly 60 further includes locked and unlocked modes shown in FIGS. 7A and 7B, respectively. The locking pins 70 on the lock assembly's detent devices 66, 67 can be engaged with the locking apertures 68 and alternately disengaged from the locking apertures 68 to define the respective locked and unlocked modes.

Specifically, in the locked mode shown in FIG. 7A, the locking pins 70 are positioned in a pair of locking apertures 68 on the lower rails 11,12. In this mode, the upper frame 20 is deterred from sliding on the base frame 10. The locking apertures 68 in the sidewalls 17 of the base frame's lower rails 11,12 are arranged in a series of opposing pairs. This arrangement enables the upper frame 20 to be secured at various selected positions along the base frame 10.

In the unlocked mode as shown in FIG. 7B, the lock assembly 60 is disengaged by withdrawing the locking pins 70 from the locking apertures 68, whereby the upper frame 20 is free to move along the base frame 10. The locking pins 70 are withdrawn from the locking apertures 68 by pulling on the handle 65 which rotates the actuating plate 61 via the primary actuating cable 62. Rotation of the actuating plate 61 draws the first 63 and second 64 detent cables inwardly toward the actuating plate 61. As a result, each of the first 63 and second 64 detent cables pulls the respective attached locking pin 70 inwardly and away from the locking apertures 68.

Also in the unlocked mode, the wheels 71 on the locking pins 70 are free to roll along the respective sidewalls 17 of the base frame's lower rails 11,12 as the upper frame 20 moves over the base frame 10. The sliding cargo carrier 1 can be moved between the retracted and extended configurations when the lock assembly 60 is in the unlocked mode.

To install the sliding cargo carrier 1 in a vehicle, the frame securing assembly 80 is initially installed in the vehicle. The slideable frame assembly 5 is then secured to the vehicle by the frame securing assembly 80 as shown in FIGS. 1-4.

In particular, the left 84 and right 85 releasable clamps of the frame securing assembly 80 are installed by affixing the vehicle attaching portions 81 to the bed of the vehicle by bolting, welding, riveting or other suitable methods. Once the releasable clamps 84,85 are installed in the vehicle, each of the holddown portions 29 of the front transverse member 13 is placed within a respective frame receiving portion 82 on the left 84 and right 85 releasable clamps. The holddown screws 83 on each of the releasable clamps 84,85 are tightened against the front transverse member 13, thereby securing the base frame 10 to the vehicle.

Conversely, the slideable frame assembly 5 can be removed from the vehicle by loosening the holddown screws 83 on the releasable clamps 84,85 and removing the front transverse member 13 from the holddown portions 29 of the clamps 84,85. The slideable frame assembly 5 can then be removed from the vehicle.

To adjust the upper frame 20 with respect to the base frame 10, the lock assembly 60 is disengaged by pulling the handle 65, thereby releasing the upper frame 20 for sliding movement on the lower frame 10. The upper frame 20 can then be moved horizontally by pushing or pulling the upper frame 20. When the upper frame 20 is in a desired position, the lock assembly 60 is engaged to secure the upper frame 20 against movement on the base frame 10.

Preferably to lock the upper frame 20 at or proximate a desired location on the lower frame 10, the handle 65 of the lock assembly 60 is released, allowing the locking pins 70 to spring outwardly toward the lower rails 11,12. If the locking pins 70 are aligned with the locking apertures 68 on the lower rails 11,12, then each locking pin 70 is urged into a respective aligned locking aperture 68. If they are not aligned when the handle 65 is released, each of the wheels 71 engages an opposing sidewall 17 as the locking pins 70 are urged outwardly toward the lower rails 11,12. In this position, the wheels 71 can ride along the respective sidewalls 17. The upper frame 20 can be slid along the base frame 10 until the locking pins 70, urged outwardly by the respective springs 77, snap into the next pair of locking apertures 68 that come into alignment with the locking pins 70.

In the retracted configuration, the locking pins 70 are disposed in the pair of opposing locking apertures 68 that are located closest to the rear transverse member 15 on the back of the base frame 10.

In the extended configuration, the locking pins 70 can be disposed in any of the other locking apertures 68 that are spaced away from the back of the base frame 10 and not nearest to the rear transverse member 15. By moving the upper frame 20 into these respective positions, the sliding cargo carrier 1 can be moved between the retracted and extended configurations, as desired. Alternatively, the wheels 71 can be resting against the lower rail's sidewalls 17 and not positioned in a pair of locking apertures 73 in the extended configuration.

Figure 12:
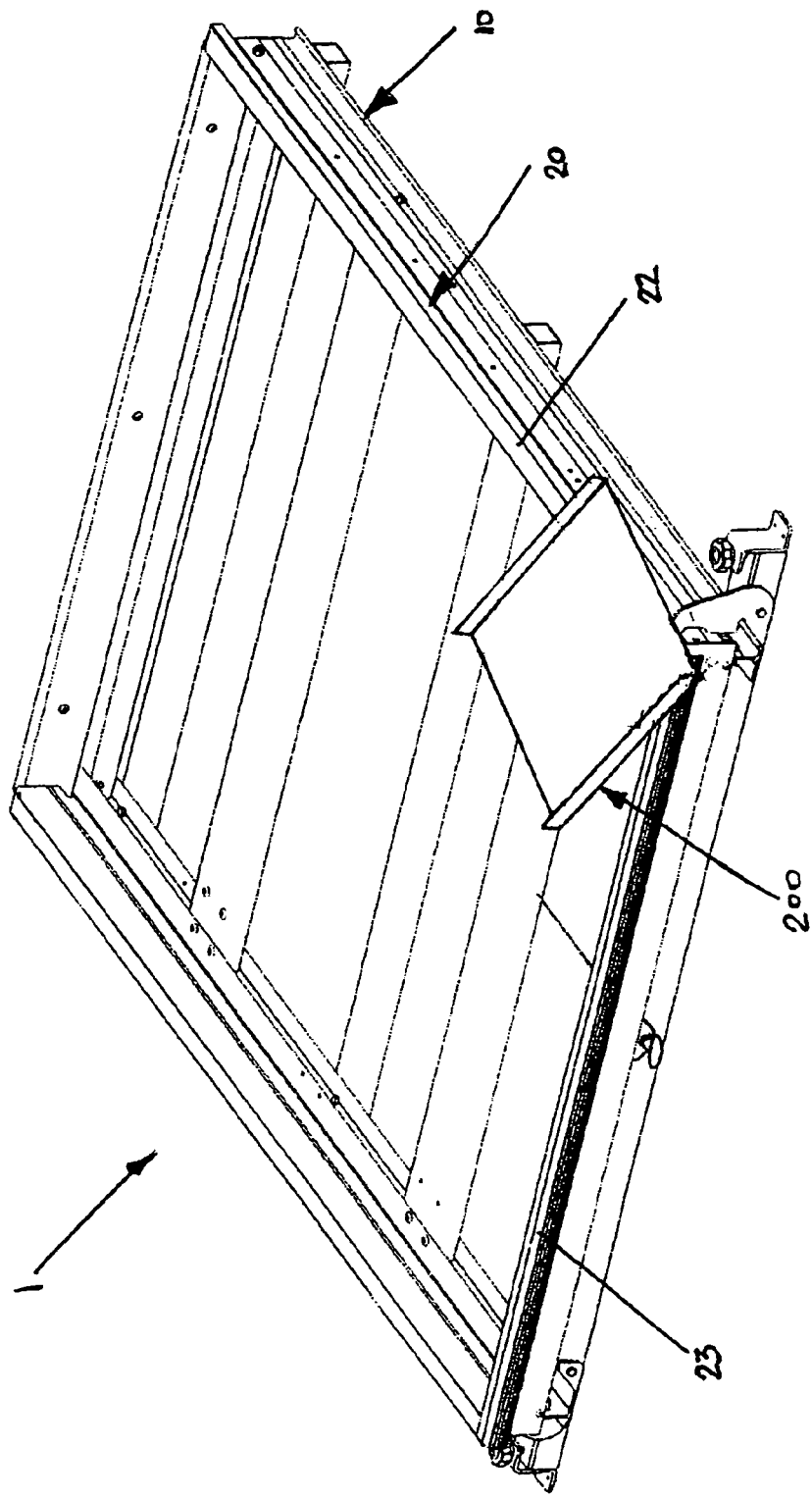
FIG. 12 is a second embodiment of the sliding cargo carrier of FIG. 1 with the tray assembly.
Figure 13:
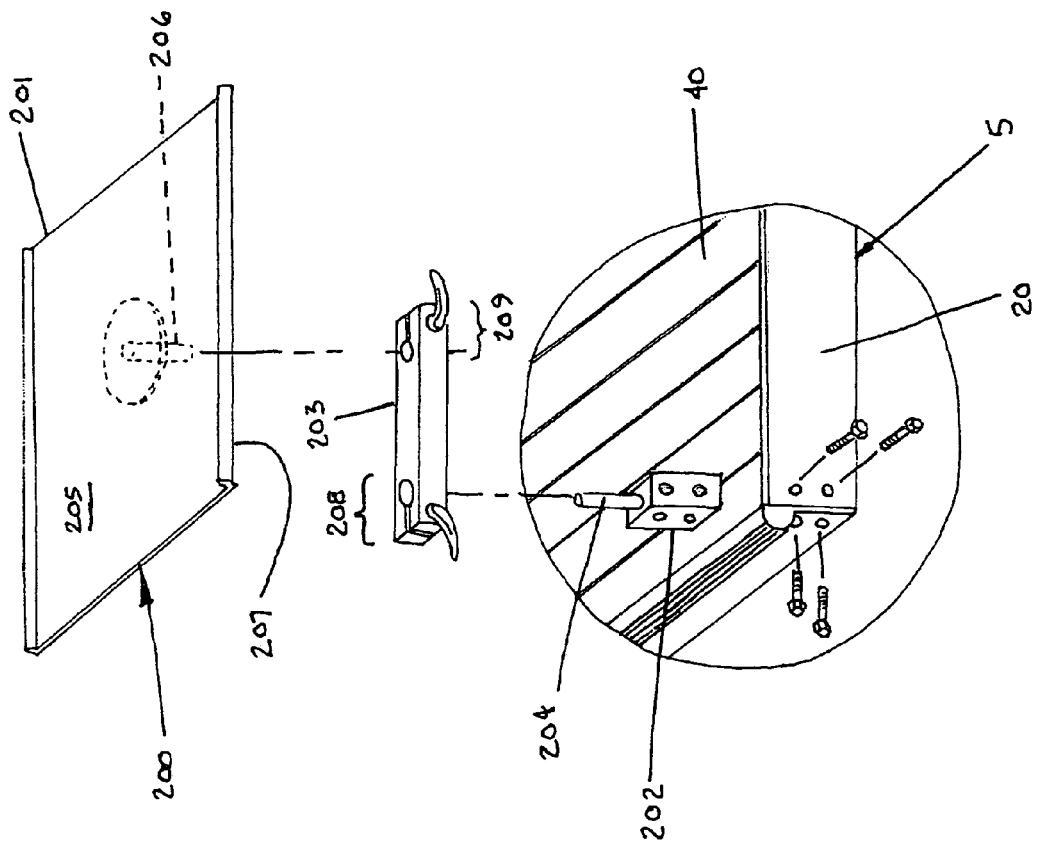
FIG. 13 is a partial exploded perspective view of the second embodiment of the sliding cargo carrier of FIG. 12 showing the upper frame with the deck removed and the tray assembly.

In a second preferred embodiment of the sliding cargo carrier 1 shown in FIGS. 12 and 13 the storage assembly 100 further comprises a third storage device. The third storage device is a tray 200 that can be removably attached to the slideable frame assembly 5. The tray 200 provides additional space for supporting items above the deck 40 on the sliding cargo carrier 1.

The tray 200 includes a table 201 and an articulating table bracket 210 for adjustably supporting the table 201 on the upper frame 20 of the sliding cargo carrier 1. The articulating table bracket 210 comprises a support block 202 and a pivoting arm 203. The support block 202 includes a pivot post 204 and is secured to the upper frame 20 by bolts or other suitable fasteners. The pivot post 204 extends upwardly from the upper frame 20. The table 201 has an upper support surface 205 and a stud 206 extending from a lower surface 207 thereof.

The pivoting arm 203 has first 208 and second 209 tray clamps. The first tray clamp 208 adjustably secures the pivoting arm 203 to the pivot post 204 of the support block 202. The second tray clamp 209 adjustably secures the table 201 to the pivoting arm 203.

The table 201 can be adjusted vertically and horizontally. To adjust the table 201, the first 208 and/or second 209 tray clamps are released and the table 201 is moved to a desired position. The tray clamps 208, 209 are then tightened to secure the table 201 in the selected position. The table 201 can be used to support desired items, such as food and beverage receptacles, barbecue grills and the like.

In the present invention, the aluminum, interlocking panels of the deck connect to each other to provide a strong, durable support surface for holding cargo. In addition, the disassembled elements that comprise the sliding cargo carrier, including the panels and slideable frame assembly are sized to fit into standard shipping containers. Therefore, when disassembled, the sliding cargo carrier can be packaged for transport by standard shipping carriers.

The sliding cargo carrier can be easily and quickly installed in a vehicle. The frame securing assembly enables a user to easily remove the slideable frame assembly from the vehicle when the sliding cargo carrier is not needed. Conversely, the sliding cargo carrier can be readily installed in the vehicle when needed. With easy removal and installation of the slideable frame assembly, versatility of the vehicle is greatly enhanced.

The means for additional storage significantly increases the storage capacity of the sliding cargo carrier. Not only does the auxiliary storage assembly provide for a more organized storage area, it also provides a more secure storage area for the cargo stored therein.

Although the present invention has been described in considerable detail with reference to certain preferred versions thereof, other versions are possible. Therefore, the spirit and scope of the appended claims should not be limited to the description of the preferred versions contained herein.

The invention claimed is:

1. A sliding cargo carrier for use in a vehicle, the sliding cargo carrier comprises:
   a base frame;
   an upper frame;
   a deck;
   a slide assembly which slideably mounts the upper frame on the base frame;
   a lock assembly which locks the upper frame at selected positions on the base frame;
   an auxiliary storage assembly; and
   a frame securing assembly which releasably attaches the base frame to a vehicle;
   said base frame comprises first and second lower rails, and front and rear transverse members;
   each of said first and second lower rails includes a foot, a downward hook, and a sidewall;
   said front transverse member includes at least one hold-down portion disposed on an outer end thereof;
   said upper frame comprises first and second upper rails, and fore and aft cross members and a transverse support bar;
   each of said first and second upper rails includes a guide wall, a base, and an upper supporting guide;
   said deck is mounted on the upper frame and is comprised of a plurality of interlocking panels, each panel having a top, a bottom, and first and second sides and first and second interlocking elements;
   each of said first interlocking elements is disposed on a first side of each of the panels and comprises a first curvature, a first groove, and an upward protuberance, wherein said first groove and said upward protuberance extend along a lower edge of the first side;
   each of said second interlocking elements is disposed on a second side of each of the panels and comprises a second curvature, a second groove, and a downward protuberance, wherein said second groove and said downward protuberance extend along a lower edge of the second side;
   wherein to engage said first and second interlocking elements of two adjacent panels, said second curvature of one panel is nested within said first curvature of an other panel, said upward protuberance of the other panel is received within said second groove of the one panel, and said downward protuberance of the one panel is received within said first groove of the other panel;
   said slide assembly comprises a plurality of rollers and two roller guides, wherein said plurality of rollers are disposed on the sidewalls of the first and second lower rails and each of said roller guides is disposed on a respective guide wall of the first and second upper rail;
   wherein said roller guides are slideably supported on the rollers, and said upper supporting guides on the first and second upper rails overlay the downward hooks of the first and second lower rails, respectively;
   said frame securing assembly includes at least one releasable clamp;

said at least one releasable clamp comprises a vehicle attaching portion, a frame receiving portion, and a holddown screw threadedly engaged in the frame receiving portion;

wherein when the slideable frame assembly is installed in a vehicle, said at least one holddown portion on the base frame is positioned within the frame receiving portion of the at least one releasable clamp, and said holddown screw engages the holddown portion;

said lock assembly comprises a detent actuator mechanism, first and second detent devices, and a plurality of locking apertures in the sidewalls of the base frame;

each of said first and second detent devices comprises a mounting plate, a locking pin, and a spring;

each of said mounting plates includes a stop and a channel having a guide slot therein;

each of said locking pins includes a shoulder, a wheel rotatably mounted on one end of the locking pin, and a guide projection;

said detent actuator mechanism comprises a handle, an actuating plate, a primary actuating cable, and first and second detent cables;

said actuating plate comprises first, second and primary anchor points and a pivotal attachment, wherein said first and second anchor points and said pivotal attachment are substantially collinear, and said primary anchor point is offset from a line extending through the first and second anchor points and the pivotal attachment;

wherein said first detent device is mounted on one end of the transverse support bar; said second detent device is mounted on an opposite end of the transverse support bar; and said actuating plate is pivotally secured to the transverse support bar by the pivotal attachment;

wherein on each of the first and second detent devices, the locking pin is supported within the channel and on the stop, said guide projection is slideably disposed within said slot, and said spring encircles the locking pin and is held in compression between the shoulder and the stop;

the first detent cable is attached at one end to the locking pin of the first detent device and attached at an opposite end to the first anchor point on the actuating plate;

the second detent cable is attached at one end to the locking pin of the second detent device and attached at an opposite end to the second anchor point on the actuating plate;

said primary actuating cable is attached at one end to the handle and is attached at an opposite end to the primary anchor point on the actuating plate;

said handle is slideably mounted on a front of the upper frame;

said lock assembly having locked and unlocked modes;

wherein in said locked mode, the locking pins of the first and second detent devices are engaged with locking apertures on the respective first and second lower rails, one of said locking pins is positioned within a respective locking aperture, and said upper frame is locked against sliding movement on the base frame;

wherein in said unlocked mode, the locking pins of the first and second detent devices are disengaged from the locking apertures, the wheels can engage the respective sidewalls, and the upper frame is free to slide on the base frame;

said sliding cargo carrier further comprising retracted and extended configurations;

wherein in said retracted configuration the upper frame is generally centered vertically over the base frame;

wherein in the extended configuration, at least a portion of the upper frame is offset vertically from the base frame.

2. The sliding cargo carrier of claim 1, wherein said auxiliary storage assembly comprises at least one first storage device which includes a receptacle and a first mounting bracket; and said first mounting bracket includes a frame engaging portion and a set screw to releasably secure the first storage device at selected positions on the upper frame.

3. The sliding cargo carrier of claim 2, wherein said auxiliary storage assembly comprises a second storage device;

said second storage device comprises at least one receptacle and a second mounting bracket;

said second mounting bracket comprises a transverse support piece and a pair of rail clamps, wherein each of said rail clamps are disposed on opposite ends of the transverse support piece, each of said rail clamps includes an adjustable locking screw to lock the second storage device in selected positions along the left and second upper rails.

4. A sliding cargo carrier comprising:

a base frame;

an upper frame including first and second upper rails;

a slide assembly which slideably mounts the upper frame on the base frame;

a deck on said upper frame;

an auxiliary storage assembly including at least one first storage device and a second storage device;

wherein said at least one first storage device comprises a side storage receptacle and a first mounting bracket which releasably secures the side storage receptacle to one of said first and second upper rails;

said second storage receptacle includes at least one cross storage receptacle and a second mounting bracket, wherein said at least one cross storage receptacle is mounted on said second mounting bracket;

said second mounting bracket comprises a transverse support piece and a pair of rail clamps, wherein one of said pair of rail clamps is selectively mounted on the first upper rail and the other of said pair of rail clamps is selectively mounted to the second upper rail for variably positioning the second storage device along said upper frame;

extended and retracted configurations;

wherein in said retracted configuration, the upper frame is generally aligned vertically over the base frame and in the extended configuration, the upper frame is generally offset vertically from the base frame.

5. The cargo slide of claim 4, wherein said at least one cross storage receptacle comprises a plurality of cross storage receptacles.

6. A sliding cargo carrier comprising:

a base frame;

an upper frame;

a deck on said upper frame; and a slide assembly for slideably mounting the upper frame on the base frame;

a lock assembly for securing the upper frame at selected positions on the base frame;

an extended configuration; and a retracted configuration;

said lock assembly comprises a detent actuator mechanism on said upper frame, at least one detent device having a locking pin on said upper frame and a plurality of locking apertures on said base frame;

said detent actuator mechanism comprises a handle, an actuating plate, a primary actuating cable and at least one detent cable, wherein said primary actuating cable extends between said handle and said actuating place, and said at least one detent cable extends between said actuating plate and said locking pin;

said lock assembly further comprises locked and unlocked modes, wherein in said locked mode, the locking pin of the at least one detent device is selectively engaged with one of the locking apertures and said upper frame is locked against sliding movement on the base frame, and in said unlocked mode, the locking pin of the at least one detent device is withdrawn from the locking apertures and the upper frame is free to slide on the base frame; and wherein in said retracted configuration the upper frame is generally vertically aligned over the base frame, and in the extended configuration the upper frame is vertically offset from the base frame.

7. The sliding cargo carrier of claim 6, wherein said actuating plate comprises first and primary anchor points and a pivotal attachment;

said first anchor point and said pivotal attachment being collinear and said primary anchor point offset from a line extending through said first anchor point and said pivotal attachment;

wherein said handle is slideably mounted on said one frame; said actuating plate is pivotably secured to said one frame by the pivotal attachment; said primary actuating cable is attached at one end to the handle and is attached at an opposite end to the primary anchor point on the actuating plate; and said at least one detent cable is attached at one end to the locking pin and is attached at an opposite end to the first anchor point on the actuating plate.

8. The sliding cargo carrier of claim 7, wherein said at least one detent device comprises first and second detent devices, said detent actuator mechanism further comprises a second detent cable, and said actuating plate further comprises a second anchor point;

wherein said second anchor point is collinear with said first anchor point and said pivotal attachment, and said second detent cable is attached at one end to the locking pin of the second detent device and is attached at an opposite end to the second anchor point.

9. The sliding cargo carrier of claim 8, wherein said other frame comprises first and second lower rails, wherein said plurality of locking apertures are disposed along a length of said first and second lower rails.

10. The sliding cargo carrier of claim 6, wherein said at least one detent device further comprises a mounting plate and a spring;

said mounting plate includes a stop which supports one end of said locking pin and a channel which slideably supports a portion of the locking pin;

said locking pin includes a shoulder and a wheel;

wherein said wheel is rotatably mounted on one end of the locking pin, and said spring is positioned around the locking pin and is held in compression between the shoulder and the stop; and wherein when said lock assembly is in said locked mode said wheel is engaged with said locking apertures, and when said lock assembly is in said unlocked mode said wheel is disengaged from said locking apertures.

11. The sliding cargo carrier of claim 10, wherein said channel having a slot therein;

said locking pin having a guide projection extending outwardly therefrom;

wherein said guide projection is slideably disposed in said slot.

12. A sliding cargo carrier comprising:

a base frame including first and second lower rails;

an upper frame including first and second upper rails;

a slide assembly for slideably mounting the upper frame on the base frame;

a deck mounted on said upper frame;

an extended configuration; and a retracted configuration;

said deck comprising a plurality of interlocking panels;

each of said first and second lower rails comprises a foot, a downward hook, and a sidewall, wherein said downward hook extends along one edge of the sidewall and said foot extends along an opposite edge of the sidewall;

each of said first and second upper rails comprises a guide wall, a base, and an upper supporting guide, wherein said upper supporting guide extends along one edge of the guide wall and said base extends along an opposite edge of the guide wall;

said slide assembly comprises a plurality of rollers disposed on said sidewalls of said first and second lower rails, and a roller guide disposed on each of the first and second upper rails, wherein said roller guides are slideably supported on at least two of said rollers, and said upper supporting guides on the first and second upper rails overlay the downward hooks of the first and second lower rails, respectively; and wherein in said retracted configuration, the upper frame is generally vertically aligned with the base frame; and in said extended configuration, the upper frame is vertically offset from the base frame.

13. The sliding cargo carrier of claim 12, wherein each of the panels comprises first and second interlocking elements; and said first interlocking element of one panel releasably engages the second interlocking element of an adjacent panel such that the first and second interlocking elements of a series of adjacent panels are engaged to assemble the deck.

14. The sliding cargo carrier of claim 13, wherein each of said panels further comprises a top, a bottom and first and second sides;

wherein said first interlocking element is disposed on the first side of each of the panels, and said second interlocking element is disposed on the second side of each of the panels.

15. The sliding cargo carrier of claim 14, wherein said first interlocking element of each panel comprises a first groove and an upward protuberance, wherein said first groove and said upward protuberance extend along a lower edge of the first side of each of the panels; and said second interlocking element of each panel comprises a second groove and a downward protuberance, wherein said second groove and said downward protuberance extend along a lower edge of the second side of each of the panels; and wherein when the plurality of panels are interlocked, said upward protuberances of one panel is received within the second groove of an adjacent panel, and each of said downward protuberances of the respective adjacent panel is received within the first groove of the one panel.

16. The sliding cargo carrier of claim 15, wherein said first interlocking element further comprises a first curvature, and said second interlocking element further comprises a second curvature;

wherein said second curvature of the adjacent panel is nested within the first curvature of the one panel.

* * * * *